United States Patent
Hong

(10) Patent No.: US 12,525,283 B2
(45) Date of Patent: Jan. 13, 2026

(54) WORD LINE BOOSTER CELL AND MEMORY ARRAY

(71) Applicant: Taiwan Semiconductor Manufacturing Company, Ltd., Hsinchu (TW)

(72) Inventor: Hyunsung Hong, Kanata (CA)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 343 days.

(21) Appl. No.: 18/322,703

(22) Filed: May 24, 2023

(65) Prior Publication Data
US 2024/0395317 A1 Nov. 28, 2024

(51) Int. Cl.
G11C 11/418 (2006.01)
(52) U.S. Cl.
CPC ................................. *G11C 11/418* (2013.01)

(58) Field of Classification Search
None
See application file for complete search history.

(56) References Cited

U.S. PATENT DOCUMENTS

2020/0043547 A1\* 2/2020 Hong .................... G11C 11/413

\* cited by examiner

*Primary Examiner* — Connie C Yoha
(74) *Attorney, Agent, or Firm* — McClure, Qualey & Rodack, LLP

(57) ABSTRACT

Word line booster cells and memory arrays are provided. A pass-gate transistor is coupled between a first control line and a first node, and has a gate coupled to a word line. A first pull-up transistor is coupled between a power supply and the first node. The first pull-up transistor has a gate coupled to a second control line. A second pull-up transistor is coupled between the power supply and the first node. The second pull-up transistor has a gate coupled to the word line. A third pull-up transistor is coupled between the power supply and the word line. The third pull-up transistor has a gate coupled to the first node. A fourth pull-up transistor is coupled between the power supply and the word line. The fourth pull-up transistor has a gate coupled to the first node.

20 Claims, 11 Drawing Sheets

WORD LINE BOOSTER CELL AND MEMORY ARRAY

BACKGROUND

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing are needed. In the course of IC evolution, functional density (i.e., the number of interconnected devices per chip area) has generally increased while geometric size (i.e., the smallest component that can be created using a fabrication process) has decreased.

Memories are commonly used in integrated circuits. Memory is indispensable for most modern electronic equipment, such as computers, personal digital assistants, cellular telephones and digital cameras. A memory device is widely used to retain computer programs or video/audio data. Therefore, increasing memory access speed requirements within semiconductor devices manufactured is desired.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
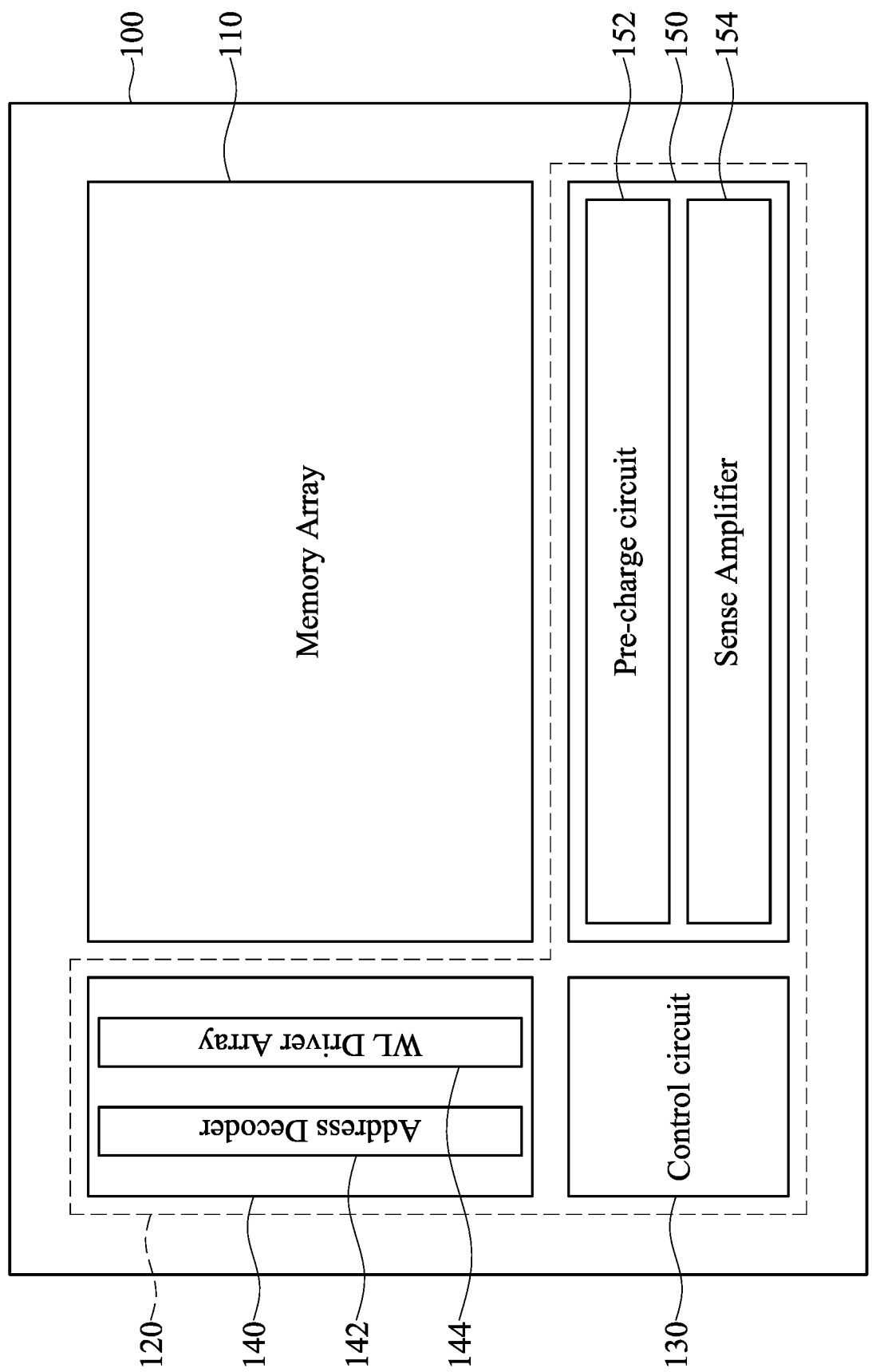
FIG. 1 shows a block diagram illustrating a memory, in accordance with some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Various semiconductor structures of integrated circuits (ICs) are provided in accordance with various exemplary embodiments. Some variations of some embodiments are discussed. Throughout the various views and illustrative embodiments, like reference numbers are used to designate like elements.

FIG. 1 shows a block diagram illustrating a memory 100, in accordance with some embodiments of the disclosure. The memory 100 includes a memory array 110 and a memory periphery circuit 120. The memory 100 is implemented in an integrated circuit (IC). The memory periphery circuit 120 includes a control circuit 130, a decoder and word line (WL) driver 140, and data input/output (I/O) circuit 150. The control circuit 130 is configured to control the decoder and WL driver 140 and the data I/O circuit 150 in response to access requests from the other circuits of the IC.

The decoder and WL driver 140 includes an address decoder 142 and a WL driver array 144. The address decoder 142 is a row decoder, and the address decoder 142 is configured to receive an access address from the control circuit 130 and to obtain a row address for the memory array 110. The row address is configured to drive (or enable) one of the word lines, so as to select the memory cells corresponding to the driven word line (i.e., the memory cells in the same row of the memory array 110) for read/write operations. In the memory array 110, multiple memory cells and at least one booster cell are arranged in each row. In some embodiments, the address decoder 142 is configured to use combinations of logic 1's and 0's on the access address to choose a unique address (i.e., the row address) for the memory array 110. The WL driver array 144 includes multiple WL drivers. Each WL driver is configured to drive the corresponding word line. Thus, the memory cells corresponding to the driven word line are accessed for read/write operations.

The data I/O circuit 150 includes a pre-charge circuit 152 and a sense amplifier circuit 154. Furthermore, the data I/O circuit 150 further includes a write driver circuit. In some embodiments, the data I/O circuit 150 further includes a column multiplexer (decoder or selector). For simplicity of illustration, the column multiplexer and the write driver circuit are not shown in the data I/O circuit 150. The column multiplexer is configured to receive column address from the control circuit 130 and enables one of the columns in the memory array 110 for read/write operations. The write driver circuit is directly connected to the bit lines of the memory array 110, and is configured to write a value to the memory cell corresponding to the row address. The pre-charge circuit 152 is configured to pre-charge all bit lines of the memory array 110 to a logic level "1" before a read/write operation is performed. The sense amplifier circuit 154 includes multiple sense amplifiers, and each sense amplifier is electrically connected to the corresponding column of the memory array 110, so as to amplify small voltage swings of a pair of bit lines (i.e., a bit line and a complementary bit line) to recognizable logic levels ("1" or "0"), so that data can be read properly from the memory cell. In some embodiments, each sense amplifier is in charge of detecting what value is stored in the corresponding memory cell during a read cycle.

Figure 2:
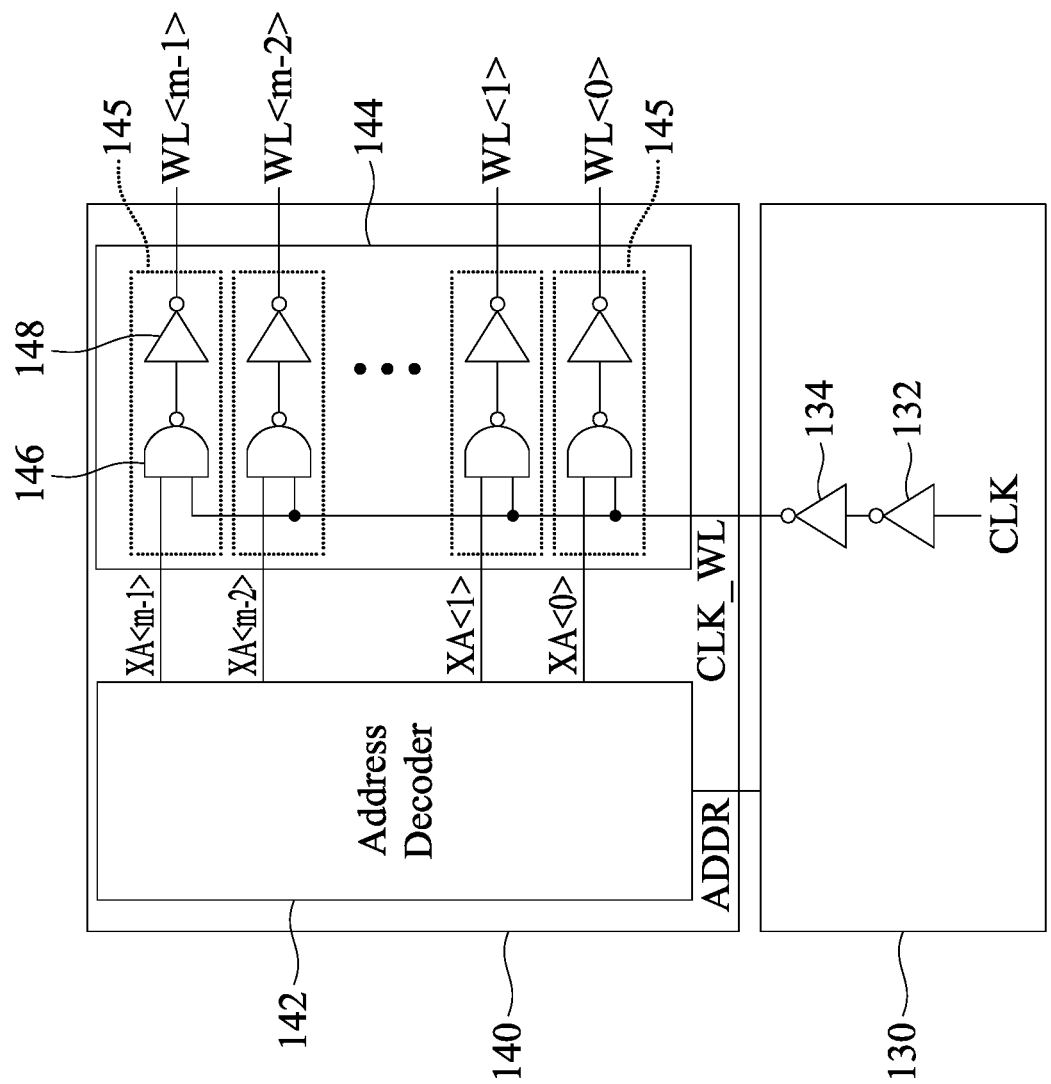
FIG. 2 shows a block diagram illustrating the control circuit and decoder and WL driver of FIG. 1, in accordance with some embodiments of the disclosure.

FIG. 2 shows a block diagram illustrating the control circuit 130 and decoder and WL driver 140 of FIG. 1, in accordance with some embodiments of the disclosure. The control circuit 130 is configured to provide the access address ADDR to the address decoder 142. According to the access address ADDR, the address decoder 142 is configured to provide the decoded address signals XA<0> through XA<m−1> to the WL driver array 144. The number of decoded address signals XA<0> through XA<m−1> is determined by the bit number of access address ADDR.

The control circuit 130 is configured to provide the clock CLK_WL to the WL driver array 144. The control circuit 130 includes the inverters 132 and 134 connected in series. The control circuit 130 is configured to use the inverters 132 and 134 connected in series to receive the clock CLK so as to generate the clock CLK_WL. In some embodiments, the control circuit 130 is configured to use a buffer to receive the clock CLK and generate the clock CLK_WL. For simplicity of illustration, the other circuits and/or devices are not shown in the control circuit 130.

The WL driver array 144 includes multiple WL drivers 145. Each WL driver 145 includes the NAND gate 146 and the inverter 148. Taking the WL driver 145 corresponding to the word line WL<0> as an example, the NAND gate 146 has a first input terminal for receiving the decoded address signal XA<0>, a second input terminal for receiving the clock CLK_WL, and an output terminal coupled to the inverter 148. According to the decoded address signal and clock CLK_WL and the corresponding decoded address signal, each WL driver 145 is configured to provide individual word line WL to the memory cells in the same row of the memory array 110. The number of decoded address signals XA<0> through XA<m−1> is equal to that of the WL drivers 145.

Figure 3:
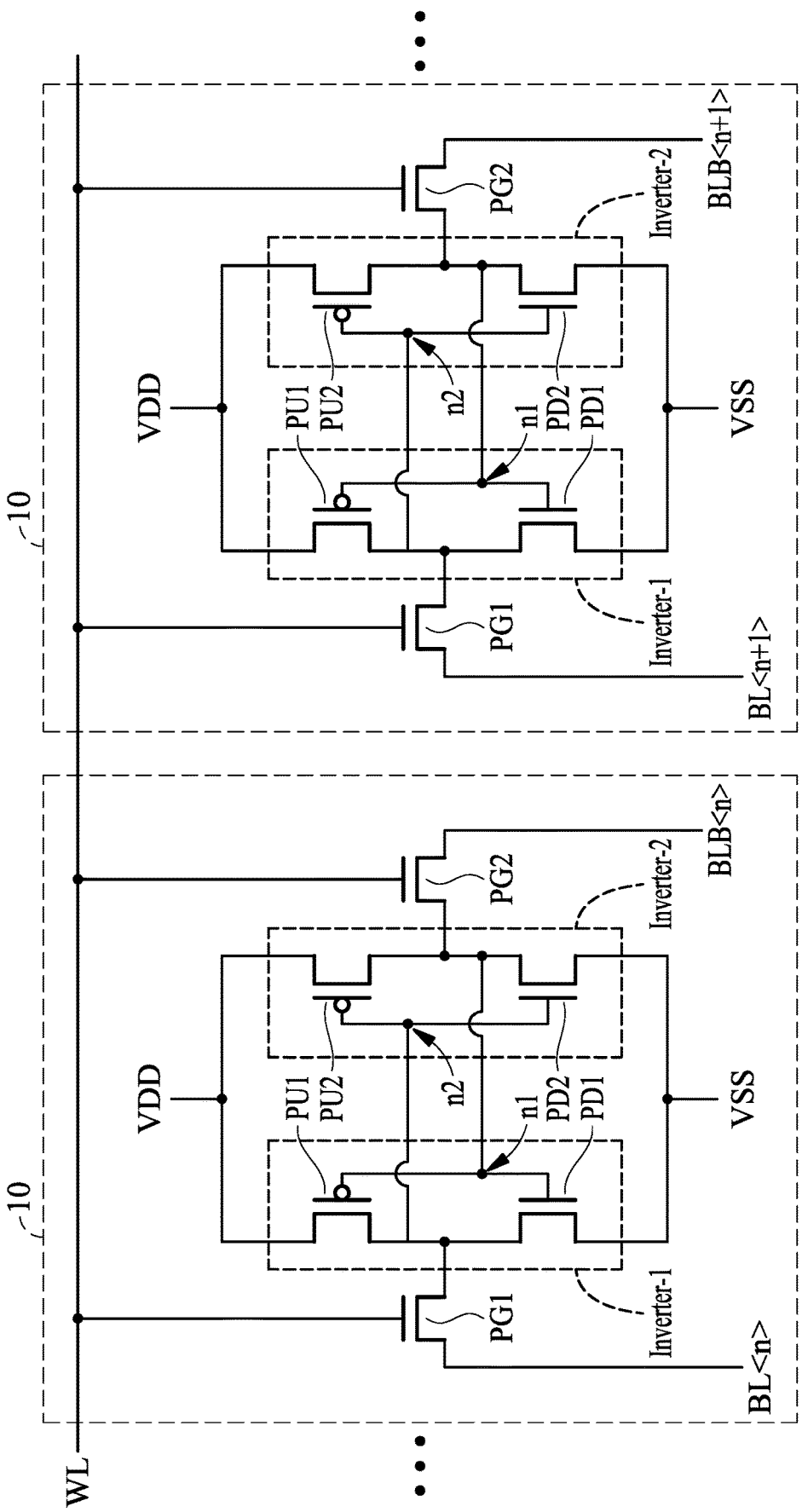
FIG. 3 shows the memory cells in one row of the memory array in FIG. 1, in accordance with some embodiments of the disclosure.

FIG. 3 shows the memory cells 10 in one row of the memory array 110 in FIG. 1, in accordance with some embodiments of the disclosure. In such embodiment, the memory cell 10 is a single-port SRAM bit cell. In some embodiments, memory cell 10 may be a multi-port SRAM bit cell. In FIG. 3, the number of memory cells 10 is merely one example and is not intended to limit the embodiments. In such embodiment, the memory cell 10 on the left and the memory cell 10 on the right are two adjacent memory cells 10.

Each memory cell 10 includes a pair of cross-coupled inverters Inverter-1 and Inverter-2, and two pass-gate transistors PG1 and PG2. The inverters Inverter-1 and Inverter-2 are cross-coupled between the nodes n1 and n2, and form a latch. The gates of the pass-gate transistors PG1 and PG2 are coupled to the same word line WL. Furthermore, the pass-gate transistors PG1 and PG2 are N-type transistors. The pass-gate transistor PG1 is coupled between a bit line BL and the node n2, and the pass-gate transistor PG2 is coupled between a complementary bit line BLB and the node n1. In some embodiments, the pass-gate transistors PG1 and PG2 are symmetrical in layout.

In each memory cell 10, the inverter Inverter-1 includes a pull-up transistor PU1 and a pull-down transistor PD1. The pull-up transistor PU1 is a P-type transistor, and the pull-down transistor PD1 is an N-type transistor. The drain of the pull-up transistor PU1 and the drain of the pull-down transistor PD1 are coupled to the node n2 connecting the pass-gate transistor PG1. The gates of the pull-up transistor PU1 and the pull-down transistor PD1 are coupled to the node n1 connecting the pass-gate transistor PG2. Furthermore, the source of the pull-up transistor PU1 is coupled to the power supply VDD, and the source of the pull-down transistor PD1 is coupled to a ground VSS.

In each memory cell 10, the inverter Inverter-2 includes a pull-up transistor PU2 and a pull-down transistor PD2. The pull-up transistor PU2 is a P-type transistor, and the pull-down transistor PD2 is an N-type transistor. The drains of the pull-up transistor PU2 and the pull-down transistor PD2 are coupled to the node n1 connecting the pass-gate transistor PG2. The gates of the pull-up transistor PU2 and the pull-down transistor PD2 are coupled to the node n2 connecting the pass gate transistor PG1. Furthermore, the source of the pull-up transistor PU2 is coupled to the power supply VDD, and the source of the pull-down transistor PD2 is coupled to the ground VSS. In some embodiments, the pull-up transistors PU1 and PU2 are symmetrical in layout, and the pull-down transistors PD1 and PD2 are symmetrical in layout.

For each memory cell 10, the pass-gate transistors PG1 and PG2 are coupled to individual bit lines BL and individual complementary bit lines BLB. For example, in the memory cell 10 on the left in FIG. 3, the pass-gate transistor PG1 is coupled to the bit line BL<n> and the pass-gate transistor PG2 is coupled to the complementary bit line BLB<n>. In the memory cell 10 on the right in FIG. 3, the pass-gate transistor PG1 is coupled to the bit line BL<n+1> and the pass-gate transistor PG2 is coupled to the complementary bit line BLB<n+1>.

The P-type transistors and the N-type transistors of the memory cell 10 are formed by either FinFET transistor or vertically stacked gate-all-around (GAA) horizontal nanosheets transistors. The FinFET transistor may include single-fin or multiple fins. The GAA transistor may include single or multiple vertically stacked nano-sheet (or nano-wire, or fork-sheet).

Figure 4:
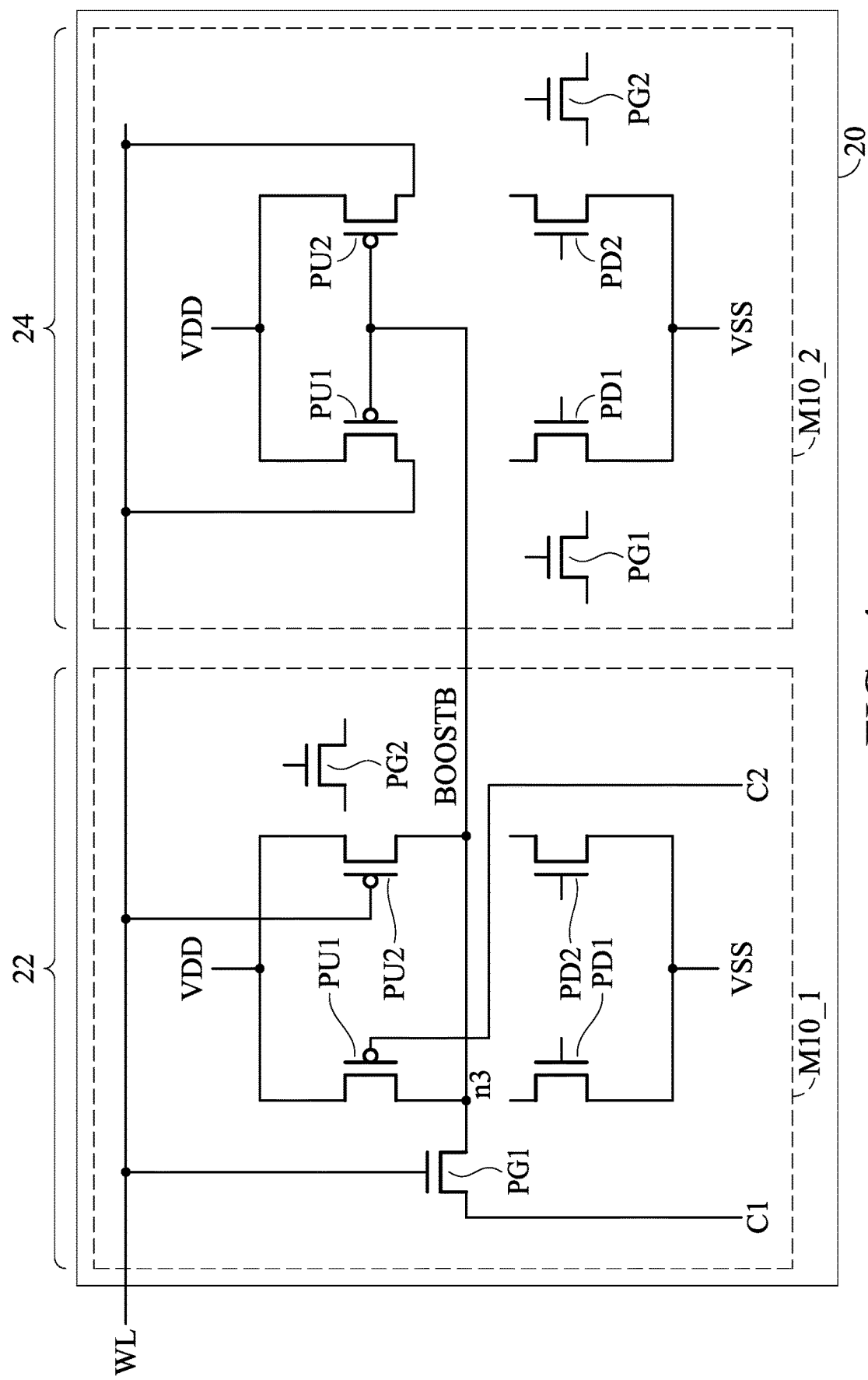
FIG. 4 shows a booster cell in the memory array of FIG. 1, in accordance with some embodiments of the disclosure.

FIG. 4 shows a booster cell 20 in the memory array 110 of FIG. 1, in accordance with some embodiments of the disclosure. The booster cell 20 includes a control part 22 and a boosting part 24. The control part 22 is implemented by a first modified unit M10_1, and the first modified unit M10_1 is obtained by modifying the connection configuration of the transistors in the memory cell 10. Moreover, the boosting part 24 is implemented by a second modified unit M10_2, and the second modified unit M10_2 is obtained by modifying the connection configuration of the transistors in the memory cell 10. For example, the first modified unit M10_1 is formed by using the memory cell 10 on the left and the second modified unit M10_2 is formed by using the memory cell 10 on the right in FIG. 3.

In the first modified unit M10_1, the pass-gate transistor PG1 is coupled between the control line C1 and the node n3, and the gate of the pass-gate transistor PG1 is coupled to the word line WL. The pull-up transistor PU1 is coupled between the node n3 and the power supply VDD, and the gate of the pull-up transistor PU1 is coupled to the control line C2. The pull-up transistor PU2 is coupled between the node n3 and the power supply VDD, and the gate of the pull-up transistor PU2 is coupled to the word line WL. Moreover, the pull-down transistor PD1 is disconnected to the pull-up transistor PU1 and the pass-gate transistors PG1 and PG2. The pull-down transistor PD2 is disconnected to the pull-up transistor PU2 and the pass-gate transistors PG1 and PG2. The pass-gate transistor PG2 is disconnected to the pull-up transistors PU1 and PU2. Compared with the memory cell 10, the pass-gate transistor PG1 and the pull-up transistors PU1 and PU2 are reconfigured (e.g., the connection is modified) and the pass-gate transistor PG2 and the pull-down transistors PD1 and PD2 are bypassed (e.g., without using the transistor) in the first modified unit M10_1. In other word, the first modified unit M10_1 is formed in the SRAM cell structure having the floating pass-gate transistor PG2 and the floating pull-down transistors PD1 and PD2.

In the second modified unit M10_2, the pull-up transistor PU1 is coupled between the word line WL and the power supply VDD, and the gate of the pull-up transistor PU1 is coupled to the node 3 of the first modified unit M10_1. The pull-up transistor PU2 is coupled between the word line WL and the power supply VDD, and the gate of the pull-up transistor PU2 is coupled to the node 3 of the first modified unit M10_1. Moreover, the pull-down transistor PD1 is disconnected to the pull-up transistor PU1 and the pass-gate transistors PG1 and PG2. The pull-down transistor PD2 is disconnected to the pull-up transistor PU2 and the pass-gate transistors PG1 and PG2. The pass-gate transistor PG2 is disconnected to the pull-up transistors PU1 and PU2. The pass-gate transistor PG1 is disconnected to the pull-up transistors PU1 and PU2. Compared with the memory cell 10, the pull-up transistors PU1 and PU2 are reconfigured and the pass-gate transistors PG1 and PG2 and the pull-down transistors PD1 and PD2 are bypassed in the second modified unit M10_2. In other word, the second modified unit M10_2 is formed in the SRAM cell structure having the floating pass-gate transistors PG1 and PG2 and the floating pull-down transistors PD1 and PD2.

The first modified unit M10_1 is formed in a first memory cell structure (e.g., SRAM cell) having the floating pass-gate transistor PG2 and the floating pull-down transistors PD1 and PD2. The second modified unit M10_2 is formed in a second memory cell structure having the floating pass-gate transistors PG1 and PG2 and the floating pull-down transistors PD1 and PD2. Moreover, the first memory cell structure is adjacent to and in contact with the second memory cell structure. In such embodiment, the area of the booster cell 20 is twice that of the memory cell 10 (i.e., the first modified unit M10_1 and the second modified unit M10_2).

In some embodiments, the memory cell 10, the first modified unit M10_1 and the second modified unit M10_2 are the same configurations formed by the front-end-of-line (FEOL) process. Furthermore, the memory cell 10, the first modified unit M10_1 and the second modified unit M10_2 have different interconnect structures formed by the back-end-of-line (BEOL) process.

Figure 5:
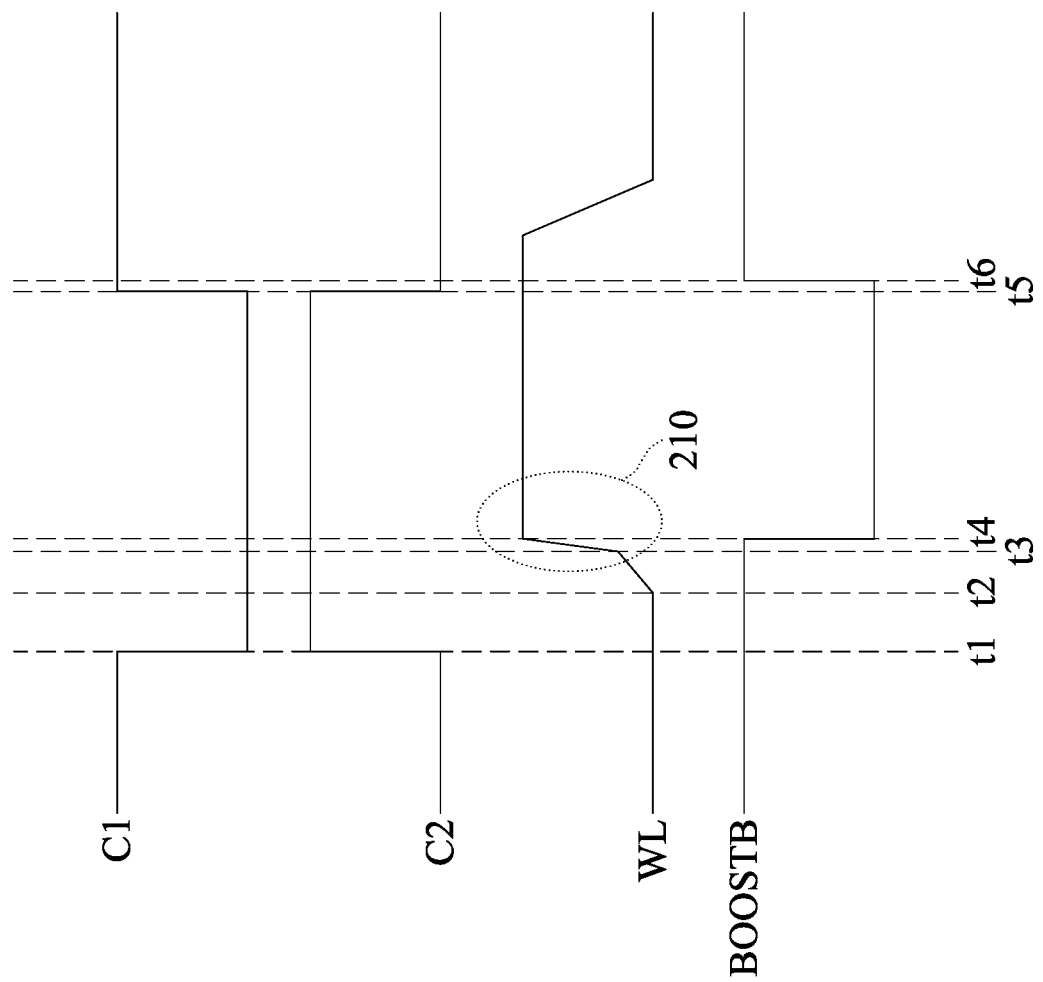
FIG. 5 shows the waveform illustrating the signals in the booster cell of FIG. 4, in accordance with some embodiments of the disclosure.

FIG. 5 shows the waveform illustrating the signals in the booster cell 20 of FIG. 4, in accordance with some embodiments of the disclosure. Referring to FIG. 4 and FIG. 5 together, when the word line WL is not driven (or disable), the word line WL is kept at a low voltage level (e.g., VSS), and the pass-gate transistor PG1 of the control port 22 is turned off. It should be noted that the control line C1 is complementary to the control line C2. When the control line C1 is operated at a high voltage level (e.g., VDD), the control line C2 is operated at a low voltage level, thus the pull-up transistor PU1 of the control part 22 is turned on. Furthermore, the pull-up transistor PU2 of the control part 22 is turned on by the word line WL. Thus, the signal BOOSTB of the node n3 is pulled to the high voltage level through the turned-on pull-up transistors PU1 and PU2 of the control part 22. At this time, the pull-up transistors PU1 and PU2 of the boosting part 24 are turned off by the signal BOOSTB.

At time t1, the control line C1 is changed from the high voltage level to the low voltage level, and the control line C2 is changed from the low voltage level to the high voltage level. At this time, the pull-up transistor PU1 of the control part 22 is turned off.

At time t2, the word line WL is driven by the corresponding WL driver 145. When the number of memory cells 10 connected to the driven word line WL is increased (i.e., the metal line of driven word line WL is longer), the rising rate (e.g., slope) of the word line WL is slower because of parasitic effect in the word line WL.

After time t3, the pass-gate transistor PG1 is start to be turned on by the driven word line WL, and the signal BOOSTB of the node n3 is pulled to the low voltage level through the turned-on pass-gate transistor PG of the control part 22 at time t4. At this time, the pull-up transistors PU1 and PU2 of the boosting part 24 are turned on by the signal BOOSTB, and the word line WL is boosting, label as 210.

At time t5, the control line C1 is changed from the low voltage level to the high voltage level, and the control line C2 is changed from the high voltage level to the low voltage level. At this time, the pull-up transistor PU1 of the control port 22 is turned on by the control line C2, the pull-up transistor PU2 of the control port 22 is turned off by the word line WL, and the pass-gate transistor PG1 of the control port 22 is turned on by the word line WL. Thus, the signal BOOSTB of the node n3 is pulled to the high voltage level through the turned-on pull-up transistor PU1 and the pass-gate transistor PG1 of the control part 22.

As shown in FIGS. 4 and 5, when the signal BOOSTB of the node n3 is pulled to the low voltage level, the pull-up transistors PU1 and PU2 of the boosting part 24 are turned on to boost the word line WL. In such embodiment, two P-type transistors (i.e., the pull-up transistors PU1 and PU2 in the boosting part 24) are used to boost the word line WL. In some embodiments, more P-type transistors are used to boost the word line WL.

Figure 6:
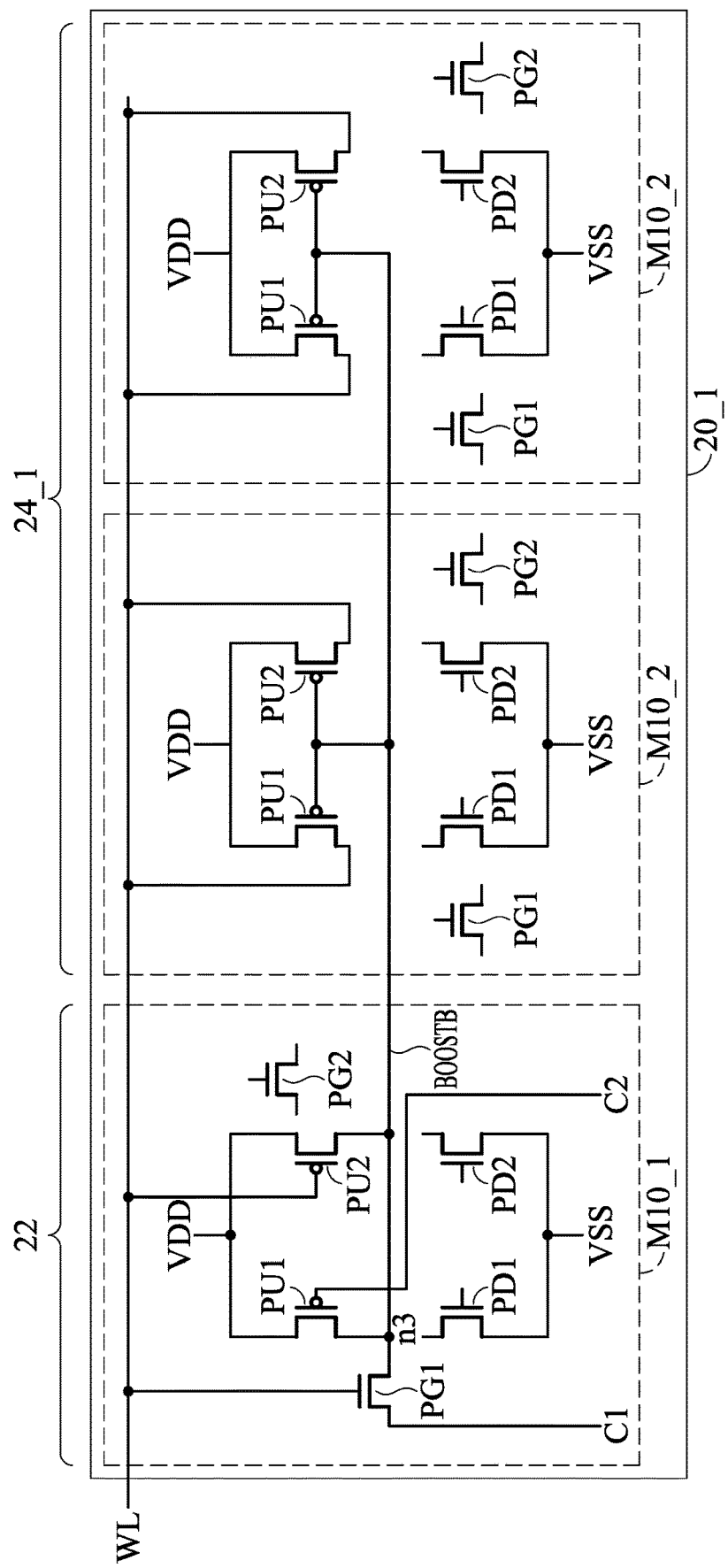
FIG. 6 shows a booster cell, in accordance with some embodiments of the disclosure.

FIG. 6 shows a booster cell 20_1, in accordance with some embodiments of the disclosure. The booster cell 20_1 includes a control part 22 and a boosting part 24_1. The control part 22 is formed by a first modified unit M10_1, and the first modified unit M10_1 is obtained by modifying the connection configuration of the transistors in the memory cell 10. Moreover, the boosting part 24_1 is formed by two second modified units M10_2, and each second modified unit M10_2 is obtained by modifying the connection configuration of the transistors in the memory cell 10.

The configurations of the first modified unit M10_1 and the second modified unit M10_2 are described in FIG. 4. Compared with the boosting part 24 in the booster cell 20 of FIG. 4, the boosting part 24_1 in the booster cell 20_1 of FIG. 6 includes two second modified units M10_2 to boost the word line WL. In such embodiment, four P-type transistors (i.e., the pull-up transistors PU1 and PU2 in the boosting part 24_1) are used to boost the word line WL. In some embodiments, the boosting part 24_1 may include more second modified units M10_2 to boost the word line WL. When the number of second modified units M10_2 is increased, the boost speed of the word line WL is increased.

Figure 7:
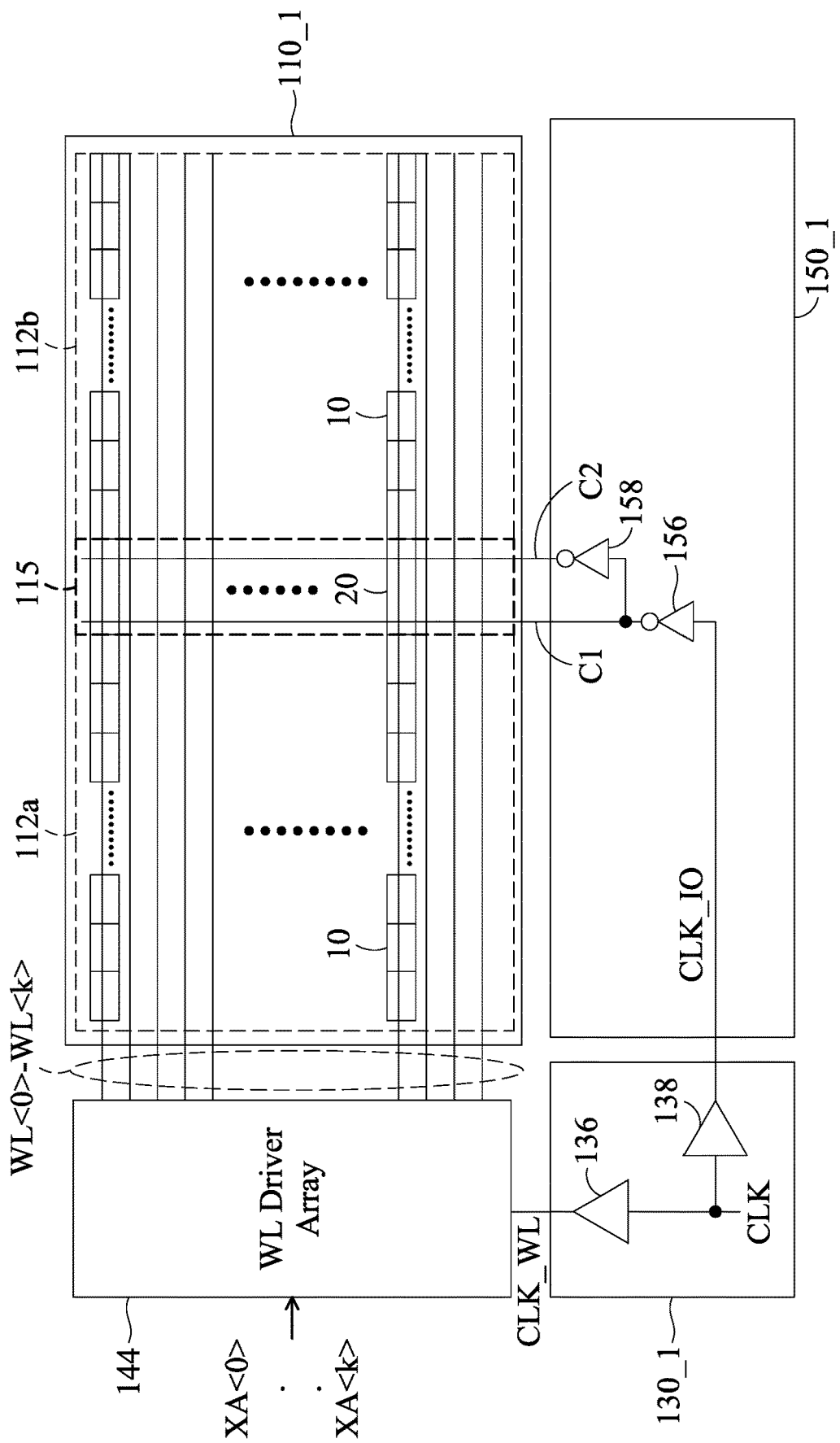
FIG. 7 shows a block diagram illustrating a memory, in accordance with some embodiments of the disclosure.

FIG. 7 shows a block diagram illustrating a memory 100_1, in accordance with some embodiments of the disclosure. The memory 100_1 includes a memory array 110_1, the control circuit 130_1, the WL driver array 144 and the data I/O circuit 150_1.

The control circuit 130_1 includes two buffers 136 and 138. According to the main clock CLK, the buffer 136 is configured to provide the clock CLK_WL to the WL driver array 144, and the buffer 138 is configured to provide the clock CLK_IO to the data I/O circuit 150_1. In such embodiment, the clock CLK_WL and the clock CLK_IO are in-phase. In some embodiments, the clock CLK_WL and the clock CLK_IO are antiphase. For simplicity of illustration, the other circuits and/or devices are not shown in the control circuit 130_1.

As described above, the WL driver array 144 is configured to provide the word lines WL<0> through WL<k> according to the clock CLK_WL and the decoded address signals XA<0> through XA<k> from the address decoder 142. Furthermore, the WL driver array 144 is configured to drive only one of the word lines WL<0> through WL<k> at a time.

The data I/O circuit 150_1 includes the inverters 156 and 158. For simplicity of illustration, the other circuits and/or devices are not shown in the data I/O circuit 150_1. According to the clock CLK_IO, the inverter 156 is configured to provide the control line C1 to the memory array 110_1, and the inverter 158 is configured to provide the control line C2 to the memory array 110_1. As described above, the control line C1 is complementary to the control line C2. Furthermore, in order to simplify the illustration, the bit lines BL and the complementary bit lines BLB are omitted in FIG. 7.

The memory array 110_1 includes the memory ranges 112a and 112b and the booster range 115, and the booster range 115 is disposed between the memory ranges 112a and 112b. In such embodiment, the booster range 115 is in contact with the memory ranges 112a and 112b. Each of the memory ranges 112a and 112b include the memory cells 10 formed in multiple rows and multiple columns of a sub-array. In each sub-array of the memory ranges 112a and 112b, the row number of memory cells 10 is equal to the number of word lines WL<0> through WL<k>. Furthermore, the column number of sub-array in the memory range 112a may equal to or different from the column number of sub-array in the memory range 112b. In other words, the number of memory cells 10 in the memory range 112a may equal to or different from the number of memory cells 10 in the memory range 112b.

The booster range 115 includes a column of booster cells 20, and each of the word lines WL<0> through WL<k> is coupled to an individual booster cell 20. In other words, the number of booster cells 20 is equal to the number of word lines WL<0> through WL<k>. As described above, the booster cell 20 includes the control part 22 formed by the first modified unit M10_1 and the boosting part 24 formed by the second modified unit M10_2. Moreover, the first modified unit M10_1 and the second modified unit M10_2 are obtained by modifying the connection configuration of the transistors in the respective memory cells 10. Therefore, the area of the booster cell 20 is twice that of the memory cell 10. In some embodiments, the booster cells 20 of the booster range 115 may be replaced with the other booster cells including the control part and the boosting part, such as the booster cell 20_1 of FIG. 6.

Figure 8:
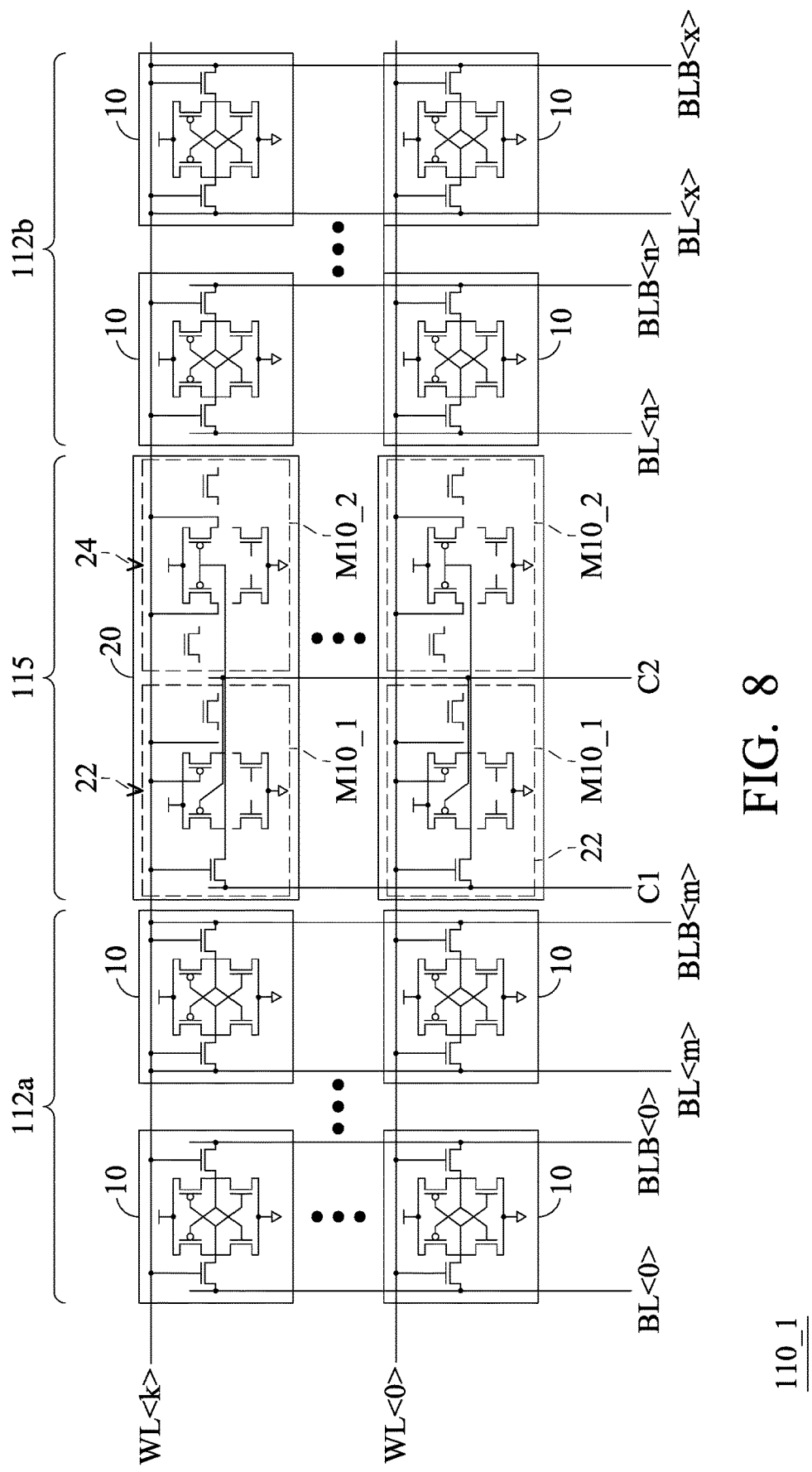
FIG. 8 shows a schematic illustrating the configuration of the memory array of FIG. 7, in accordance with some embodiments of the disclosure.

FIG. 8 shows a schematic illustrating the configuration of the memory array 110_1 of FIG. 7, in accordance with some embodiments of the disclosure. The memory array 110_1 is divided into the memory range 112a, the booster range 115 and the memory range 112b.

The memory range 112a includes the memory cells 10 arranged in multiple rows and multiple columns of a sub-array. The memory cells 10 arranged in the same rows are connected to the corresponding word line. For example, the memory cells 10 arranged in the lowest row are connected to the word line WL<0>, and the memory cells 10 arranged in the highest row are connected to the word line WL<k>. Moreover, the memory cells 10 arranged in the same column are connected to the corresponding bit line and the corresponding complementary bit line BLB. For example, the memory cells 10 arranged in the leftmost column are connected to the bit line BL<0> and the complementary bit line BLB<0>, and the memory cells 10 arranged in the rightmost column are connected to the bit line BL<m> and the complementary bit line BLB<m>. Furthermore, the bit line BL and the complementary bit line BLB connected to the same column are complementary.

The memory range 112b includes the memory cells 10 arranged in multiple rows and multiple columns of a sub-array. The memory cells 10 arranged in the same rows are connected to the corresponding word line. For example, the memory cells 10 arranged in the lowest row are connected to the word line WL<0>, and the memory cells 10 arranged in the highest row are connected to the word line WL<k>. Moreover, the memory cells 10 arranged in the same column are connected to the corresponding bit line and the corresponding complementary bit line BLB. For example, the memory cells 10 arranged in the leftmost column are connected to the bit line BL<n> and the complementary bit line BLB<n>, and the memory cells 10 arranged in the rightmost column are connected to the bit line BL<x> and the complementary bit line BLB<x>. Furthermore, the bit line BL and the complementary bit line BLB connected to the same column are complementary. In such embodiment, the bit line BL<m> and the bit line BL<n> are two consecutive bit lines, and the complementary bit line BLB<m> and the complementary bit line BLB<n> are two consecutive complementary bit lines.

The booster range 115 includes the booster cells 20 arranged in the same column. Each booster cell 20 includes the control part 22 and the boosting part 24. The control part 22 includes one first modified unit M10_1. The boosting part 24 includes one or more second modified unit M10_2. In such embodiment, the boosting part 24 includes one second modified unit M10_2. In some embodiment, the boosting part 24 includes two or more second modified units M10_2, such as the boosting part 24_1 in FIG. 6. In each word line WL, the booster cell 20 is sandwiched between the last memory cell 10 (e.g., the rightmost memory cell 10) of the memory range 112a and the first memory cell 10 of the memory range 112b. Furthermore, each booster cell 20 is in contact with the last memory cell 10 of the memory range 112a and the first memory cell 10 (e.g., the leftmost memory cell 10) of the memory range 112b.

In the memory array 110_1, the memory cell 10 and the first modified unit M10_1 and the second modified unit M10_2 of the booster cell 20 are the same configurations formed by the FEOL process. In other words, the transistors in the memory cell 10 and the transistors in the first modified unit M10_1 and the second modified unit M10_2 have the same configuration. In the memory array 110_1, the configuration (e.g., layout) of the transistors are the same. Thus, the layout is matched and the mismatch error can be avoided for the memory array 110_1.

As described in FIG. 4, the unused transistors are floating in the first modified unit M10_1 and the second modified unit M10_2. For example, the pull-down transistors PD1 and PD2 of the first modified unit M10_1 and the second modified unit M10_2 are floating. The pass-gate transistor PG2 of the first modified unit M10_1 and the pass-gate transistors PG1 and PG2 of the second modified unit M10_2 are floating. The different interconnect structures of the memory cell 10, the first modified unit M10_1 and the second modified unit M10_2 are formed by the BEOL process.

In the memory array 100_1, the number of memory cells 10 corresponding to each word line WL are the same. In some embodiments, the number of memory cells 10 in the memory range 112a is larger than the number of memory cells 10 in the memory range 112b. For example, the booster range 115 is located in three quarters of the memory array 110_1 (e.g., ¾ point of the word line WL), and the number of memory cells 10 in the memory range 112a is three times the number of memory cells 10 in the memory range 112b. In some embodiments, the number of memory cells 10 in the memory range 112a is equal to the number of memory cells 10 in the memory range 112b. For example, the booster range 115 is located in half of the memory array 110_1 (e.g., ½ point of the word line WL).

In FIG. 8, the memory cell 10 and the booster cells 20 are formed in one cell array. Each row of the cell array includes one booster cell 20, and the booster cells 20 are arranged in the same column in the cell array. In the cell array, the location of the booster range 115 formed by the booster cells 20 is determined according to the memory capacity (or memory size), operation voltage of the memory, operation temperature of the memory, process condition of the memory and so on.

Figure 9:
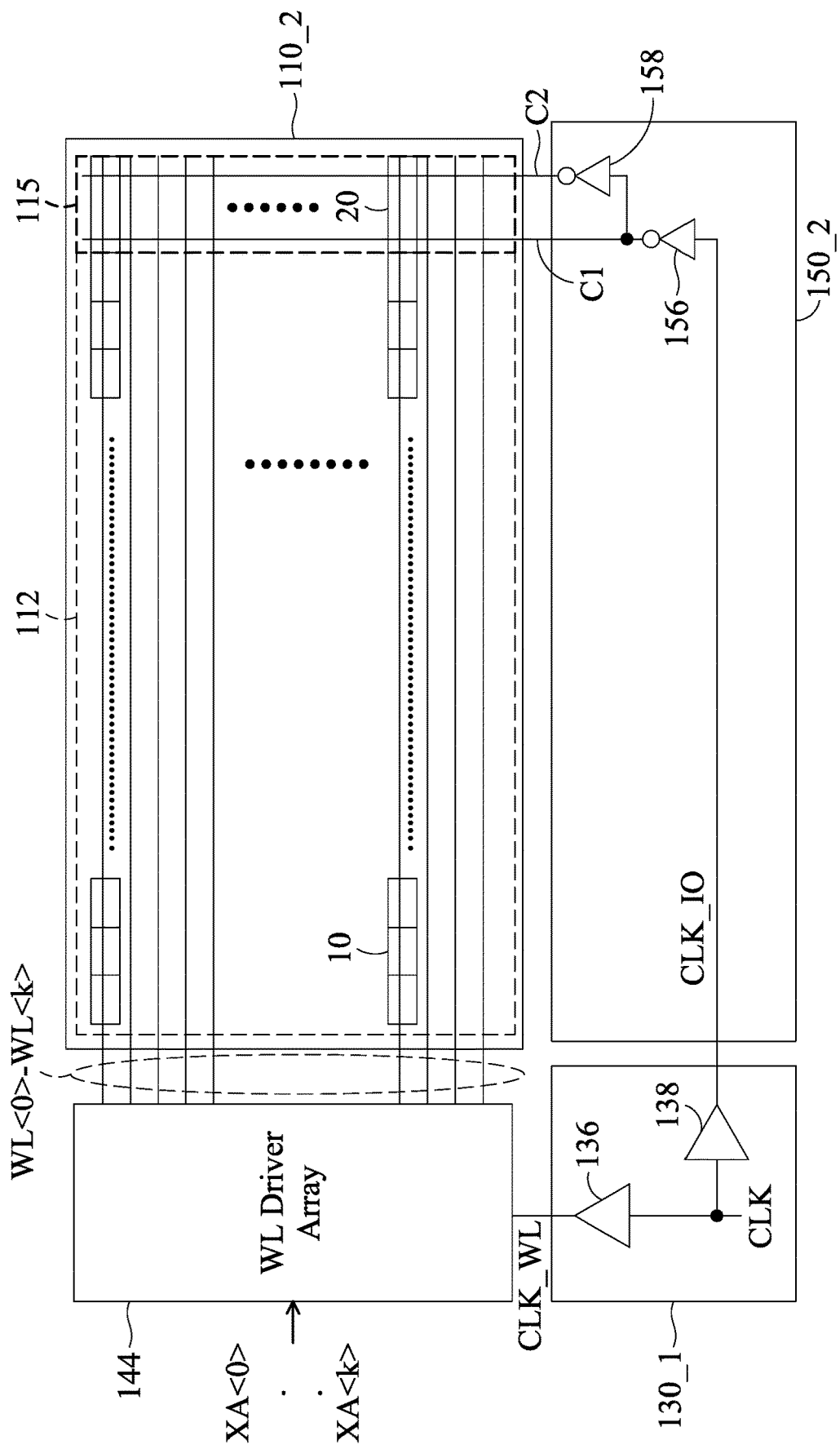
FIG. 9 shows a block diagram illustrating a memory, in accordance with some embodiments of the disclosure.

FIG. 9 shows a block diagram illustrating a memory 100_2, in accordance with some embodiments of the disclosure. The memory 100_2 includes a memory array 110_2, the control circuit 130_1, the WL driver array 144 and the data I/O circuit 150_2. The configuration of the memory 100_2 in FIG. 9 is similar to the configuration of the memory 100_1 in FIG. 7, and the difference between the memory 100_2 in FIG. 9 and the memory 100_1 in FIG. 7 is that the location of the booster range 115 in FIG. 9 is different from that of the booster range 115 in FIG. 7.

The data I/O circuit 150_2 includes the inverters 156 and 158. Compared with the data I/O circuit 150_1 of FIG. 7, the interface for providing the control signals C1 and C2 is moved to the end in the data I/O circuit 150_2 of FIG. 9. The arrangement of the interface for providing the control signals C1 and C2 is determined according to the location of the booster range 115.

The memory array 110_2 includes one memory range 112 and one booster range 115, and the booster range 115 is disposed at the end of the memory range 112. In other words, the location of the booster range 115 is away from the WL driver array 144. The memory range 112 includes the memory cells 10 arranged in multiple rows and multiple columns of a cell array. In the memory range 112, the row number of memory cells 10 is equal to the number of word lines WL<0> through WL<k>. Furthermore, the column number of memory cells 10 in the memory range 112 is equal to the number of bit lines BL.

The booster range 115 includes a column of booster cells 20, and each of the word lines WL<0> through WL<k> is coupled to an individual booster cell 20. In other words, the number of booster cells 20 is equal to the number of word lines WL<0> through WL<k>. As described above, the booster cell 20 includes the control part 22 formed by the first modified unit M10_1 and the boosting part 24 formed by the second modified unit M10_2. Moreover, the first modified unit M10_1 and the second modified unit M10_2 are obtained by modifying the connection configuration of the transistors in the respective memory cells 10. Therefore, the area of the booster cell 20 is twice that of the memory cell 10. In some embodiments, the booster cells 20 of the booster range 115 may be replaced with the other booster cells including the control part and the boosting part, such as the booster cell 20_1 of FIG. 6.

Figure 10:
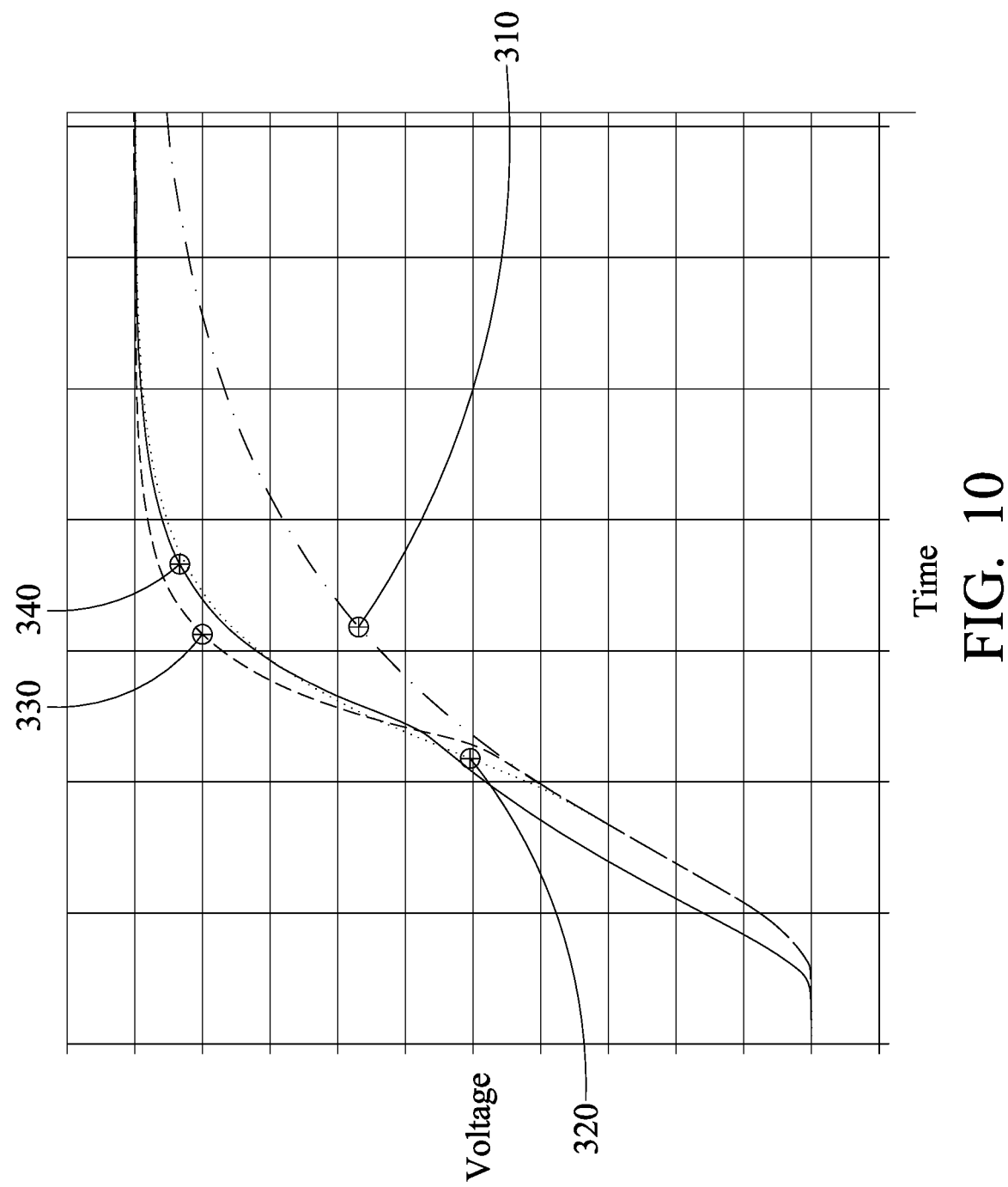
FIG. 10 shows a waveform diagram illustrating the rise of the word line WL with different boosting conditions, in accordance with some embodiments of the disclosure.

FIG. 10 shows a waveform diagram illustrating the rise of the word line WL with different boosting conditions, in accordance with some embodiments of the disclosure. The waveform 310 is the word line WL without the booster cell 20. The waveform 320 is the word line WL with the booster cell 20 located in the middle of the word line WL. The waveform 330 is the word line WL with the booster cell 20 located three-quarters (e.g., ¾ point) of the word line WL. The waveform 340 is the word line WL with the booster cell 20 located in the end of the word line WL. As shown in FIG. 10, the waveform 330 has a better boost effect for the word line WL. Compared with the traditional memory with a booster array that is independent of the memory array, the booster region of the booster cells 20 can be arranged at a suitable location within the memory array to provide the better boost effect for the word. In other word, compared with the traditional booster array having a fixed location, the booster region formed by the booster cells 20 has a flexible location.

Figure 11:
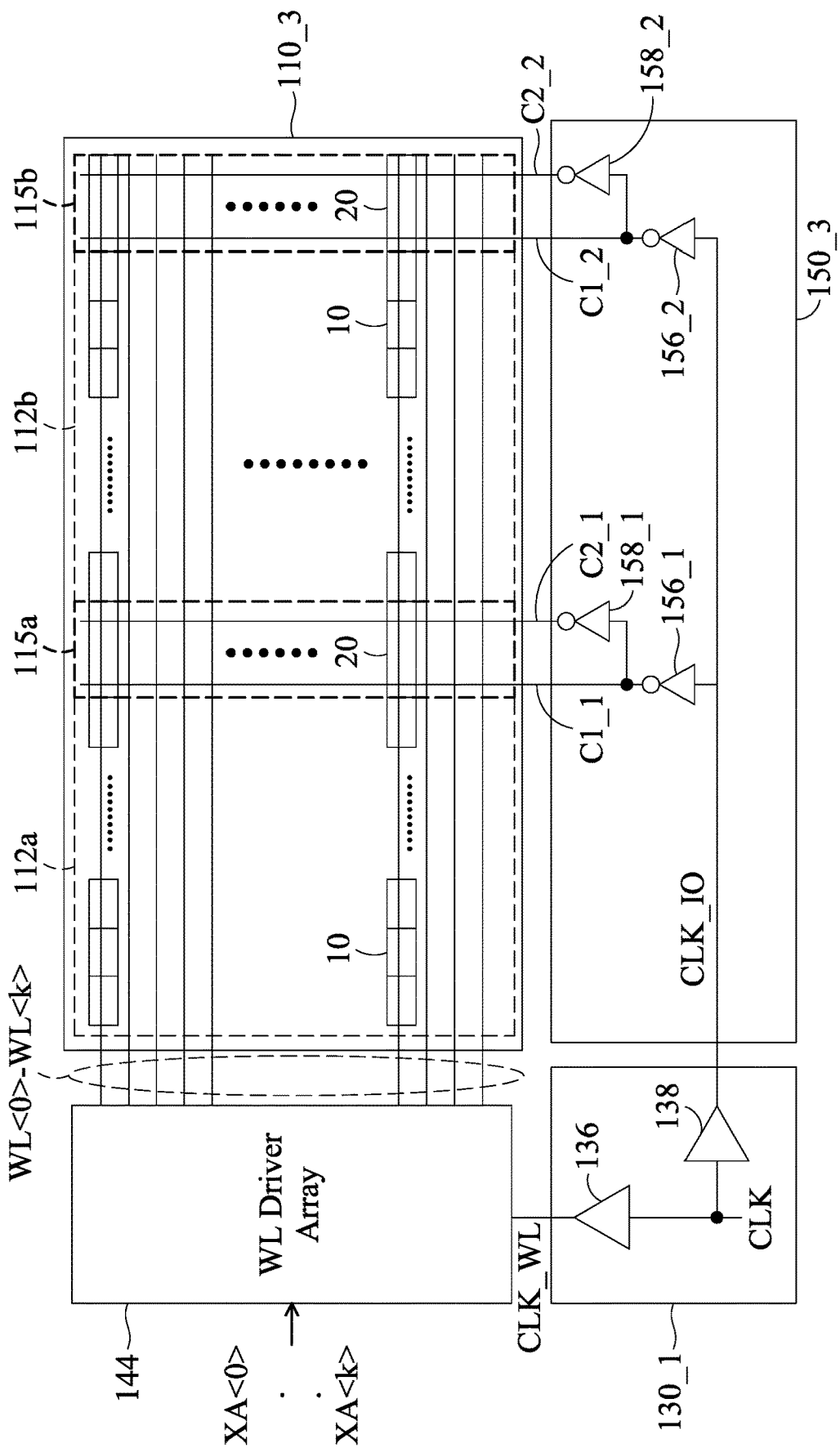
FIG. 11 shows a block diagram illustrating a memory, in accordance with some embodiments of the disclosure.

FIG. 11 shows a block diagram illustrating a memory 100_3, in accordance with some embodiments of the disclosure. The memory 100_3 includes a memory array 110_3, the control circuit 130_1, the WL driver array 144 and the data I/O circuit 150_3. The configuration of the memory 100_3 in FIG. 11 is similar to the configuration of the memory 100_1 in FIG. 7, and the difference between the memory 100_3 in FIG. 11 and the memory 100_1 in FIG. 7 is that the memory array 110_3 includes two booster ranges 115a and 115b.

The data I/O circuit 150_3 includes the inverters 156_1, 156_2, 158_1 and 158_2. According to the clock CLK_IO, the inverter 156_1 is configured to provide the control line C1_1 to the memory array 110_3, and the inverter 158_1 is configured to provide the control line C2_1 to the memory array 110_3. As described above, the control line C1_1 is complementary to the control line C2_1. Similarly, according to the clock CLK_IO, the inverter 156_2 is configured to provide the control line C1_2 to the memory array 110_3, and the inverter 158_2 is configured to provide the control line C2_2 to the memory array 110_3. Compared with the data I/O circuit 150_1 of FIG. 7, two interfaces for providing the control signals C1_1 and C2_1 and the control signals C1_2 and C2_2 are used in FIG. 11.

The memory array 110_3 includes the memory ranges 112a and 112b and the booster ranges 115a and 115b. The booster range 115a is disposed between the memory ranges 112a and 112b, and the booster range 115b is disposed at the end of the memory range 112b. Each of the memory ranges 112a and 112b includes the memory cells 10 arranged in multiple rows and multiple columns of a sub-array. In some embodiments, the number of memory cells 10 in the memory range 112a is equal to the number of memory cells 10 in the memory range 112b.

Each of the booster ranges 115a and 115b includes a column of booster cells 20, and each of the word lines WL<0> through WL<k> is coupled to an individual booster cell 20. In other words, the number of booster cells 20 is equal to the number of word lines WL<0> through WL<k> in each of the booster ranges 115a and 115b. In some embodiments, the booster cells 20 of the booster ranges 115a and/or 115b may be replaced with the other booster cells including the control part and the boosting part, such as the booster cell 20_1 of FIG. 6. In some embodiments, the memory array 110_3 includes more than two booster ranges 115a and 115b when the amount of memory cells 10 on the same word line is increased.

Embodiments for memory arrays and booster cells are provided. In the memory array, the booster cells are provided by modifying the interconnection of the memory cells. Compared with a traditional memory having an independent booster array, the memory of the embodiments has a smaller area because there is no gap between the memory cells 10 and the booster cells 20. Furthermore, the location of the booster range in the memory array is flexible, so as to increase the performance for boosting the word lines.

In some embodiments, a word line booster cell is provided. The booster cell includes a pass-gate transistor, a first pull-up transistor, a second pull-up transistor, a third pull-up transistor and a fourth pull-up transistor. The pass-gate transistor is coupled between a first control line and a first node, and has a gate coupled to a word line. The first pull-up transistor is coupled between the power supply and the first node, and has a gate coupled to a second control line. The second pull-up transistor is coupled between the power supply and the first node, and has a gate coupled to the word line. The third pull-up transistor is coupled between the power supply and the word line, and has a gate coupled to the first node. The fourth pull-up transistor is coupled between the power supply and the word line, and has a gate coupled to the first node.

In some embodiments, a memory array is provided. The memory array includes a first memory range, a second memory range and a booster range. The first memory range includes a plurality of memory cells arranged into the rows and columns of a first sub-array. The second memory range includes the memory cells arranged into the rows and columns of a second sub-array. The booster range includes a plurality of booster cells arranged in one column. The number of rows in the first sub-array, the number of rows in the second sub-array, and the number of booster cells are the same, and each word line corresponds to an individual row in the first sub-array and an individual row in the second sub-array. The booster range is disposed between and in contact with the first and second memory ranges.

In some embodiments, a memory array is provided. The memory array includes a memory range and a first booster range. The memory range includes a plurality of memory cells arranged into the rows and columns of a sub-array, and the memory range is accessed by a plurality of word lines. The first booster range includes a plurality of booster cells, and each of the booster cells is disposed in the end of an individual word line. Each of the booster cells includes a pass-gate transistor, a first pull-up transistor, a second pull-up transistor, a third pull-up transistor and a fourth pull-up transistor. The pass-gate transistor is coupled between a first control line and a first node, and the pass-gate transistor has a gate coupled to the corresponding word line. The first pull-up transistor is coupled between a power supply and the first node, and the first pull-up transistor has a gate coupled to a second control line. The second pull-up transistor is coupled between the power supply and the first node, and the second pull-up transistor has a gate coupled to the corresponding word line. The third pull-up transistor is coupled between the power supply and the corresponding word line, and the third pull-up transistor has a gate coupled to the first node. The fourth pull-up transistor is coupled between the power supply and the corresponding word line, and the fourth pull-up transistor has a gate coupled to the first node. The pass-gate transistor and the first and second pull-up transistors are formed in a first memory cell structure, and the first memory cell structure has one floating pass-gate transistor and two floating pull-down transistors. The third and fourth pull-up transistors are formed in a second memory cell structure, and the second memory cell structure has two floating pass-gate transistors and two floating pull-down transistors.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory array, comprising:
   a memory range comprising a plurality of memory cells arranged into rows and columns of a sub-array, wherein the memory range is accessed by a plurality of word lines; and
   a first booster range comprising a plurality of booster cells, and each of the booster cells is disposed in an end of an individual word line,
   wherein each of the booster cells comprises:
   a pass-gate transistor coupled between a first control line and a first node, having a gate coupled to the corresponding word line;
   a first pull-up transistor coupled between a power supply and the first node, having a gate coupled to a second control line;
   a second pull-up transistor coupled between the power supply and the first node, having a gate coupled to the corresponding word line;
   a third pull-up transistor coupled between the power supply and the corresponding word line, having a gate coupled to the first node; and
   a fourth pull-up transistor coupled between the power supply and the corresponding word line, having a gate coupled to the first node, wherein the pass-gate transistor and the first and second pull-up transistors are formed in a first memory cell structure having one floating pass-gate transistor and two floating pull-down transistors, wherein the third and fourth pull-up transistors are formed in a second memory cell structure having two floating pass-gate transistors and two floating pull-down transistors.

2. The memory array as claimed in claim 1, wherein the first control line is complementary to the second control line.

3. The memory array as claimed in claim 1, wherein the booster cells are arranged in one column adjacent to a last column of the sub-array.

4. The memory array as claimed in claim 1, wherein a number of the rows of the sub-array is equal to a number of the booster cells.

5. The memory array as claimed in claim 1, wherein the first memory cell structure is adjacent to the second memory cell structure in layout.

6. The memory array as claimed in claim 1, further comprising:
a second booster range comprising the booster cells, and each of the booster cells is disposed in a middle of the individual word line.

7. The memory array as claimed in claim 1, wherein the first memory cell structure is in contact with the second memory cell structure in layout.

8. The memory array as claimed in claim 1, wherein the first and second pull-up transistors are symmetrical in layout, and the third and fourth pull-up transistors are symmetrical in layout.

9. A memory array, comprising:
a memory range comprising a plurality of memory cells arranged into rows and columns of a sub-array, wherein the memory range is accessed by a plurality of word lines; and
a first booster range comprising a plurality of booster cells, and each of the booster cells is disposed in an end of an individual word line,
wherein each of the booster cells comprises:
a pass-gate transistor coupled between a first control line and a first node, having a gate coupled to the corresponding word line;
a first pull-up transistor coupled between a power supply and the first node, having a gate coupled to a second control line;
a second pull-up transistor coupled between the power supply and the first node, having a gate coupled to the corresponding word line;
a third pull-up transistor coupled between the power supply and the corresponding word line, having a gate coupled to the first node; and
a fourth pull-up transistor coupled between the power supply and the corresponding word line, having a gate coupled to the first node,
wherein the pass-gate transistor and the first and second pull-up transistors are formed in a memory cell structure having one floating pass-gate transistor and two floating pull-down transistors.

10. The memory array as claimed in claim 9, wherein the first control line is complementary to the second control line.

11. The memory array as claimed in claim 9, wherein the booster cells are arranged in one column adjacent to a last column of the sub-array.

12. The memory array as claimed in claim 9, wherein a number of the rows of the sub-array is equal to a number of the booster cells.

13. The memory array as claimed in claim 9, wherein the first and second pull-up transistors are symmetrical in layout, and the third and fourth pull-up transistors are symmetrical in layout.

14. The memory array as claimed in claim 9, further comprising:
a second booster range comprising the booster cells, and each of the booster cells is disposed in a middle of the individual word line.

15. A memory array, comprising:
a memory range comprising a plurality of memory cells arranged into rows and columns of a sub-array, wherein the memory range is accessed by a plurality of word lines; and
a first booster range comprising a plurality of booster cells, and each of the booster cells is disposed in an end of an individual word line,
wherein each of the booster cells comprises:
a pass-gate transistor coupled between a first control line and a first node, having a gate coupled to the corresponding word line;
a first pull-up transistor coupled between a power supply and the first node, having a gate coupled to a second control line;
a second pull-up transistor coupled between the power supply and the first node, having a gate coupled to the corresponding word line;
a third pull-up transistor coupled between the power supply and the corresponding word line, having a gate coupled to the first node; and
a fourth pull-up transistor coupled between the power supply and the corresponding word line, having a gate coupled to the first node.

16. The memory array as claimed in claim 15, wherein the first control line is complementary to the second control line.

17. The memory array as claimed in claim 15, wherein the booster cells are arranged in one column adjacent to a last column of the sub-array.

18. The memory array as claimed in claim 15, wherein a number of the rows of the sub-array is equal to a number of the booster cells.

19. The memory array as claimed in claim 15, wherein the first and second pull-up transistors are symmetrical in layout, and the third and fourth pull-up transistors are symmetrical in layout.

20. The memory array as claimed in claim 15, further comprising:
a second booster range comprising the booster cells, and each of the booster cells is disposed in a middle of the individual word line.

* * * * *